US009060087B2

(12) United States Patent
Hashimoto

(10) Patent No.: US 9,060,087 B2
(45) Date of Patent: Jun. 16, 2015

(54) APPARATUS AND METHOD FOR DETERMINING A STORAGE LOCATION BASED ON THE AMOUNT OF ELECTRICITY STORED IN A SECONDARY BATTERY OF AN IMAGE PROCESSING APPARATUS

(71) Applicant: CANON KABUSHIKI KAISHA, Tokyo (JP)

(72) Inventor: Minoru Hashimoto, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/279,080

(22) Filed: May 15, 2014

(65) Prior Publication Data

US 2014/0340703 A1 Nov. 20, 2014

(30) Foreign Application Priority Data

May 17, 2013 (JP) .................................. 2013-105062

(51) Int. Cl.
*G06F 3/12* (2006.01)
*H04N 1/00* (2006.01)

(52) U.S. Cl.
CPC ....... *H04N 1/00888* (2013.01); *H04N 1/00901* (2013.01); *H04N 1/00904* (2013.01)

(58) Field of Classification Search
CPC .......... H04N 1/00888; H04N 1/00904; H04N 1/00901; H04N 1/00893; H04N 1/00891
USPC ............................................... 358/1.13–1.17
See application file for complete search history.

(56) References Cited

U.S. PATENT DOCUMENTS

| 6,941,479 | B1 * | 9/2005 | Sugiura | 713/300 |
|---|---|---|---|---|
| 2011/0010722 | A1 * | 1/2011 | Matsuyama | 718/103 |
| 2011/0314319 | A1 * | 12/2011 | Kurahashi | 713/340 |
| 2012/0314243 | A1 * | 12/2012 | Tsujii | 358/1.14 |
| 2013/0250333 | A1 * | 9/2013 | Matsuda | 358/1.13 |

FOREIGN PATENT DOCUMENTS

JP 2006-313407 A 11/2006

* cited by examiner

*Primary Examiner* — Benny Q Tieu
*Assistant Examiner* — Quyen V Ngo
(74) *Attorney, Agent, or Firm* — Canon USA, Inc., I.P. Division

(57) ABSTRACT

In a method of controlling an image processing apparatus having a rechargeable secondary battery, in response to reception of a job, an amount of electricity stored in the secondary battery is detected and, whether the detected amount of electricity exceeds a specified value is determined. If it is determined that the stored electricity amount exceeds the specified value, a volatile memory is selected as a storage destination of information to be stored when the job is executed. On the other hand, if it is determined that the stored electricity amount does not exceed the specified value, a nonvolatile memory is selected as the storage destination of the information to be stored when the job is executed.

7 Claims, 8 Drawing Sheets

FIG. 8

| JOB TYPE | TIME NECESSARY FOR PROCESSING IN POWER FAILURE | NECESSARY STORED ELECTRICITY AMOUNT |
|---|---|---|
| COPY | 3 SECOND(S) | 6mAh |
| PRINT | 6 SECOND(S) | 12mAh |
| SCAN | 5 SECOND(S) | 10mAh |
| FAX | 1 SECOND(S) | 2mAh |

APPARATUS AND METHOD FOR DETERMINING A STORAGE LOCATION BASED ON THE AMOUNT OF ELECTRICITY STORED IN A SECONDARY BATTERY OF AN IMAGE PROCESSING APPARATUS

BACKGROUND OF THE INVENTION

1. Field of the Invention

The present invention relates to an image processing apparatus having a secondary battery, a method of controlling the image processing apparatus, and a program.

2. Description of the Related Art

In multi-functional peripherals (MFPs) having a print function, a scanning function, and a facsimile function, and printers, history information is managed in association with a job to be executed and managed. Specifically, even if a power failure occurs in the middle of the execution of printing, scanning, or facsimile processing (hereinafter, referred to as job processing) and the job is interrupted, it is required to correctly maintain history information such as a page counter, and to continue the job processing (recovery processing) after recovery from the power failure. To achieve this, as a first method, progress information of the job processing is sequentially written in a nonvolatile memory during the job processing.

As a second method, a rechargeable secondary battery is mounted on the apparatus, and when a power failure is detected, electric power is supplied from the secondary battery, and the progress information of the job processing is stored in a nonvolatile memory such as a hard disk drive (HDD) or a flash memory. For example, in a case of a print job, the number of pages printed in the job being processed is stored in a nonvolatile memory when a power failure occurred, and for the recovery processing subsequent to return from the power failure, the number of data-processed pages is stored.

In the above-described image processing apparatus, for example, in the case of the print job, each time the printing of one page is completed, the billing information is stored in the nonvolatile memory, and for the recovery subsequent to the return from the power failure, when data processing for each page is completed, the number of the processed page is stored as job progress information. In the job processing, the information is appropriately stored in the nonvolatile memory, and consequently, even if a power failure occurs at any time, no problems occur. In the first method, however, the writing speed to the nonvolatile memory is lower than the writing speed to a volatile memory, and the recovery information is sequentially written in the middle of the job processing. Consequently, the time necessary for the writing processing decreases the processing speed.

Especially, when a NAND type flash memory is used as the nonvolatile memory, it is hard to effectively perform the sequential writing processing of data of small amounts in different addresses. In the MFP, jobs of different job types can be processed in parallel. Consequently, it is also necessary to consider writing the job progress information to different addresses for the individual job types.

In the second method, when the amount of electric power stored in the secondary battery is smaller than the amount of electric power to be consumed in the storage processing of the progress information at the time of the occurrence of the power failure, it is not possible to use the memory.

To make up for the problems in these two methods, in a known technique, when the amount of the electricity stored in the secondary battery is insufficient to store the progress information in the nonvolatile memory, the first method is employed, and when the stored electricity amount of the secondary battery is sufficient, the second method is employed.

For example, the technique is applied to a method of using a cache memory in an HDD (Japanese Patent Application Laid-Open No. 2006-313407). In this method, depending on a stored electricity amount, the cache memory is switched between a write-back mode in which the processing speed is high and synchronization is necessary at the time of occurrence of a power failure, and a write-through mode in which the processing speed is low and synchronization is not necessary at the time of occurrence of a power failure. In the job processing in the MFP, however, providing such a dedicated hardware discussed in the known technique for the sequential storage of the progress information of the job increases the costs.

SUMMARY OF THE INVENTION

The present invention is directed to providing a system capable of switching storage destinations of information to be stored, depending on a stored electricity amount of a secondary battery, between a volatile memory and a nonvolatile memory to which electric power is supplied from the secondary battery.

To achieve this, an image processing apparatus according to an exemplary embodiment of the present invention has a configuration described as follows. According to an aspect of the present invention, an image processing apparatus includes a reception unit configured to receive a job, a rechargeable secondary battery, a detection unit configured to detect an amount of electricity stored in the secondary battery in response to the reception of the job, a determination unit configured to determine whether the detected amount of electricity exceeds a specified value, and a selection unit configured to select a volatile memory as a storage destination of information to be stored in accordance with execution of the job if it is determined that the stored electricity amount exceeds the specified value, and select a nonvolatile memory as the storage destination of information to be stored in accordance with the execution of the job if it is determined that the stored electricity amount does not exceed the specified value.

Further features of the present invention will become apparent from the following description of exemplary embodiments with reference to the attached drawings.

BRIEF DESCRIPTION OF THE DRAWINGS

FIG. 8 illustrates amounts of electric power to be stored in a secondary battery for individual job types.

DESCRIPTION OF THE EMBODIMENTS

Various exemplary embodiments, features, and aspects of the present invention will be described in detail below with reference to the drawings.

<Description of System Configuration>

Figure 1:
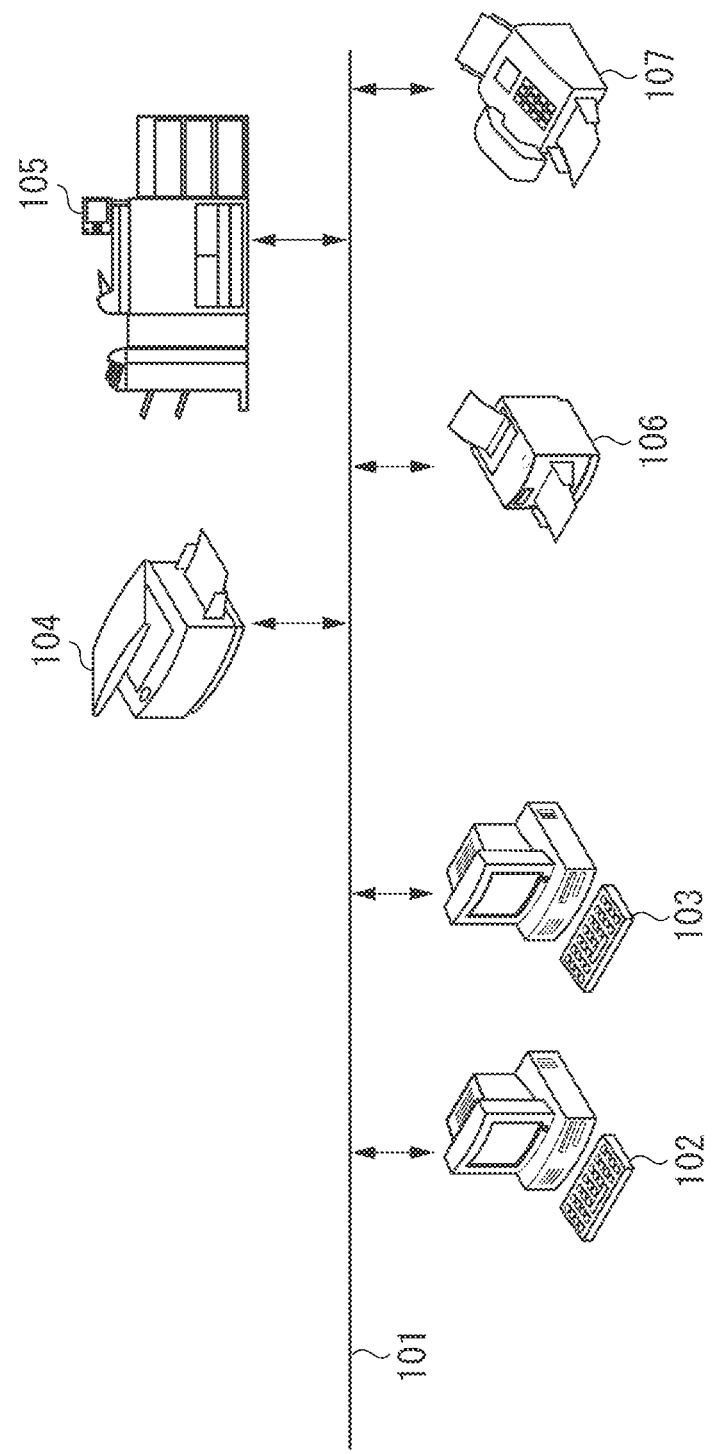
FIG. 1 illustrates an example of an image processing system to which an image processing apparatus is applied.

FIG. 1 illustrates an example of an image processing system to which an image processing apparatus according to the first exemplary embodiment is applied. In this exemplary embodiment, for example, an MFP, a printing apparatus, a facsimile apparatus, an image processing apparatus, and an information processing apparatus are connected with each other via a network. In this exemplary embodiment, the image processing apparatus can perform a predetermined job, for example, a print job, a scan job, a copy job, or a facsimile job. The image processing apparatus according to the exemplary embodiment includes, as a reception unit for receiving a job, a unit for receiving a job from a user through an operation unit 201, and a unit for receiving a job using a network.

Hereinafter, in this exemplary embodiment, an example of changing a storage destination of predetermined information such as job progress information depending on an amount of electricity stored in a secondary battery at the time of print job start is described.

In FIG. 1, MFPs 104 and 105, a printer 106, a FAX 107, and other devices are connected to a network 101. In this exemplary embodiment, a network complying with an Ethernet (registered trademark) standard is used as the network. This exemplary embodiment does not depend on the format of the network, and therefore, the exemplary embodiment can also be applied to networks according to the other standards.

In the MFPs 104 and 105, functions of copy, printer, and scanner are integrated. The MFPs have variations, for example, they may support color printing, or various printing speeds. The printer 106 and the FAX 107 are single-function devices. Personal computers (PCs) 102 and 103 are used by users. The PCs 102 and 103, through data transmission and reception to/from the MFPs 104 and 105, the printer 106, the FAX 107, and other devices connected to the network 101, can perform printing operation, scanning operation, and FAX transmission operation.

A configuration and operation of the MFP 104 are described. This exemplary embodiment of the present invention can also be applied to the MFP 105, the printer 106, and the FAX 107, and for the sake of simplicity, the MFP 104 is described as an example.

Figure 2:
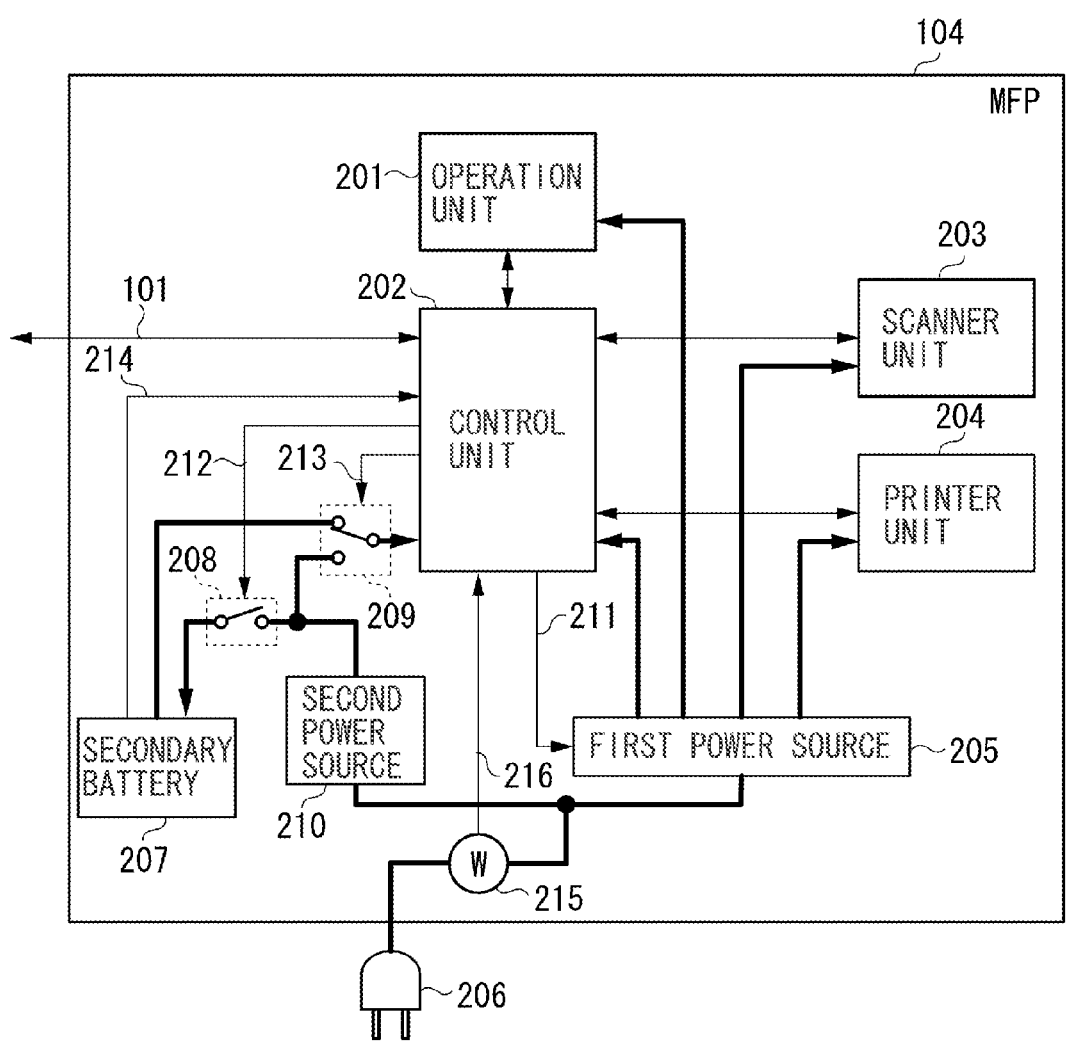
FIG. 2 is a block diagram illustrating an internal configuration of an MFP in FIG. 1.

FIG. 2 is a block diagram illustrating an internal configuration of the MFP 104 illustrated in FIG. 1.

In FIG. 2, a control unit 202 is a part for controlling the operation of the MFP 104. The control unit 202 sends and receives data, converts the data, stores the data, and performs power control. When the MFP 104 performs a printing operation, job data is generated in the PC 102, the data is transferred via the network 101 to the control unit 202, and temporarily stored. The control unit 202 converts the stored job data into image data and transfers the data to a printer unit 204. Under the control of the control unit 202, in the printer unit 204, the image data is printed on recording paper, and the paper is discharged outside the apparatus.

When the MFP 104 performs a scanning operation, a user sets an original document on a scanner unit 203, and then, the user operates buttons while referring to a screen on the operation unit 201 to make scanning operation settings and then to give an instruction to start the operation. Under the control of the control unit 202, the scanner unit 203 optically reads the original document and converts the data into image data. The image data is temporarily stored in the control unit 202, and then, transferred to a sending destination specified through the operation unit 201 in advance.

When the MFP 104 performs a copying operation, the user sets an original document on the scanner unit 203, and then, the user operates buttons while referring to a screen on the operation unit 201 to make copying operation settings and then to give an instruction to start the copying operation. Under the control of the control unit 202, the scanner unit 203 optically reads the original document and converts the data into image data. The image data is temporarily stored in the control unit 202, and then, in the control unit 202, the data format is converted into a data format usable in the printer unit 204. In the printer unit 204, the image data is printed on recording paper, and the paper is discharged outside the apparatus.

A first power source 205 and a second power source 210 convert the voltage of a commercial power supply of alternating current from a power plug 206, into direct current voltage to be used in the individual units in the MFP 104. The power supply output of the first power source 205 is controlled by a power supply control signal 211 output from the control unit 202. In a normal mode, the first power source 205 is turned on, and in an energy-saving mode, the first power source 205 is turned off. In the energy-saving mode, when no job processing is performed in the apparatus, power supply to parts other than the control unit 202 is stopped in order to reduce the power consumption of the commercial power supply. In the energy-saving mode, in the control unit 202, transmission and reception of a job can be detected. When reception of a job is detected, the power supply control signal 211 is switched to enter the normal mode to turn on the first power source 205.

A rechargeable secondary battery 207 supplies electric power to the control unit 202 while the control unit 202 is performing operation for storing job progress information when the MFP 104 is operating in the normal mode and a power failure is detected in a voltmeter 215.

In recharging, electric power is supplied from the second power source 210, and the control unit 202 changes a recharge switch control signal 212 to control a recharge switch 208 to be in an on state. In stopping recharging, the control unit 202 changes the recharge switch control signal 212 to control the recharge switch 208 to be in an off state.

A power feeding changing switch 209 is used to switch power sources for supplying electricity to the control unit 202 by changing a power feeding change control signal 213 by the control unit 202. With the power feeding changing switch 209, the source of power supply can be switched between power supply from the secondary battery 207 and power supply from the commercial power supply. In the normal mode, electricity is supplied from the commercial power supply. In storing job progress information at the time of occurrence of a power failure, the power is switched to supply from the secondary battery 207. The voltmeter 215 indicates the voltage value of the commercial power supply to be supplied to the MFP 104. When the value indicated by the voltmeter 215 is lower than a predetermined value, it is determined that a power failure has occurred. The control unit 202 can obtain the voltage value via a voltmeter communication signal 216.

Figure 3:
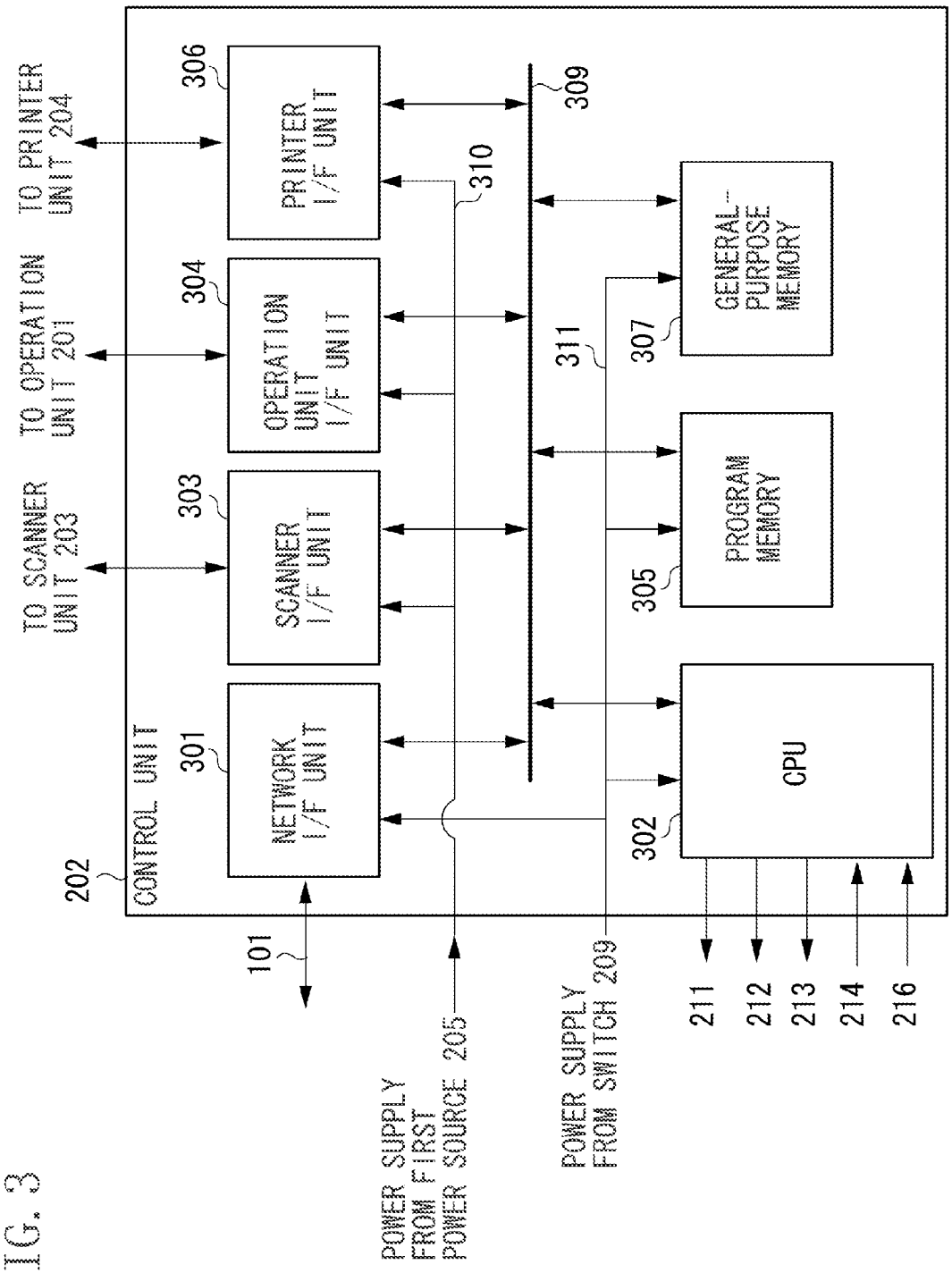
FIG. 3 is a block diagram illustrating a configuration of a control unit in the MFP in FIG. 1.

FIG. 3 is a block diagram illustrating a configuration of the control unit 202 in the MFP 104 illustrated in FIG. 1.

In FIG. 3, a central processing unit (CPU) 302 that controls the control unit 202 reads a program from a low-speed non-volatile memory 305, writes the data in a high-speed general-purpose memory 307, and executes the program on the general-purpose memory 307. The general-purpose memory 307 is also used as a temporary storage area. In addition to the CPU 302 and the general-purpose memory 307, via an internal bus 309, a network I/F 301 for performing network communication, a scanner I/F 303 for communicating with the scanner unit 203, and a printer I/F 306 for communicating with the printer unit 204 are connected. The general-purpose memory 307 includes a volatile memory medium.

When the MFP 104 is in the energy-saving mode, by the power supply control signal 211 output from the CPU 302, the output of the first power source 205 has been turned off. In such a state, in the control unit 202, the network I/F 301, the CPU 302, the nonvolatile memory 305, and the general-purpose memory 307 to which power is supplied from the second power source 210 are operating.

A shift from the power-saving state to the normal state according to the energy-saving mode is triggered when a wake packet is received via the network 101. The CPU 302 analyzes the contents of the packet received via the network 101, and determines whether the destination of the packet is the MFP 104. When the CPU 302 determines that the destination of the wake packet is the MFP 104, the CPU 302 changes the power supply control signal 211. When the CPU 302 determines that the destination of the wake packet is not the MFP 104, the CPU 302 ignores the packet.

In the normal mode, when printing, copying, facsimile, or the operation of the operation unit 201 by the user is not performed, the CPU 302 changes the state to the power-saving state. The CPU 302 causes the shift to the power-saving state, which includes, shutting down the operating system (OS) or termination processing of each unit and after that controlling the power supply control signal 211 to turn off the first power source 205.

To the CPU 302, the above-described recharge switch 208, the power feeding changing switch 209, a secondary battery status signal line 214, and the voltmeter communication line 216 are connected. The CPU 302 can know a stored electricity amount of the secondary battery 207 via the secondary battery status signal line 214. The CPU 302, when the stored electricity amount of the secondary battery 207 falls below 100%, turns on the recharge switch 208 to recharge, and when the stored electricity amount comes to 100%, turns off the recharge switch 208 to stop the recharging. The configuration and operation of the single MFP 104 have been above described. In this exemplary embodiment, job progress information is stored each time progress is made during job processing. As storage modes of the job progress information, two modes are provided.

In a first job progress information storage mode (first mode), job progress information is written in the nonvolatile memory 305. In a second job progress information storage mode (second mode), job progress information is written in the general-purpose memory 307. When a power failure is detected, the job progress information stored in the general-purpose memory 307 is copied to the nonvolatile memory 305.

In this exemplary embodiment, the job progress information includes various kinds of information such as a page counter indicating the number of printed sheets, the progress information of data processing to be used in recovery from a power failure, parameters in image quality correction used in printing, and the number of a page sent in scanning. The individual generate timings of the progress information to be recorded are different with each other.

Figure 4:
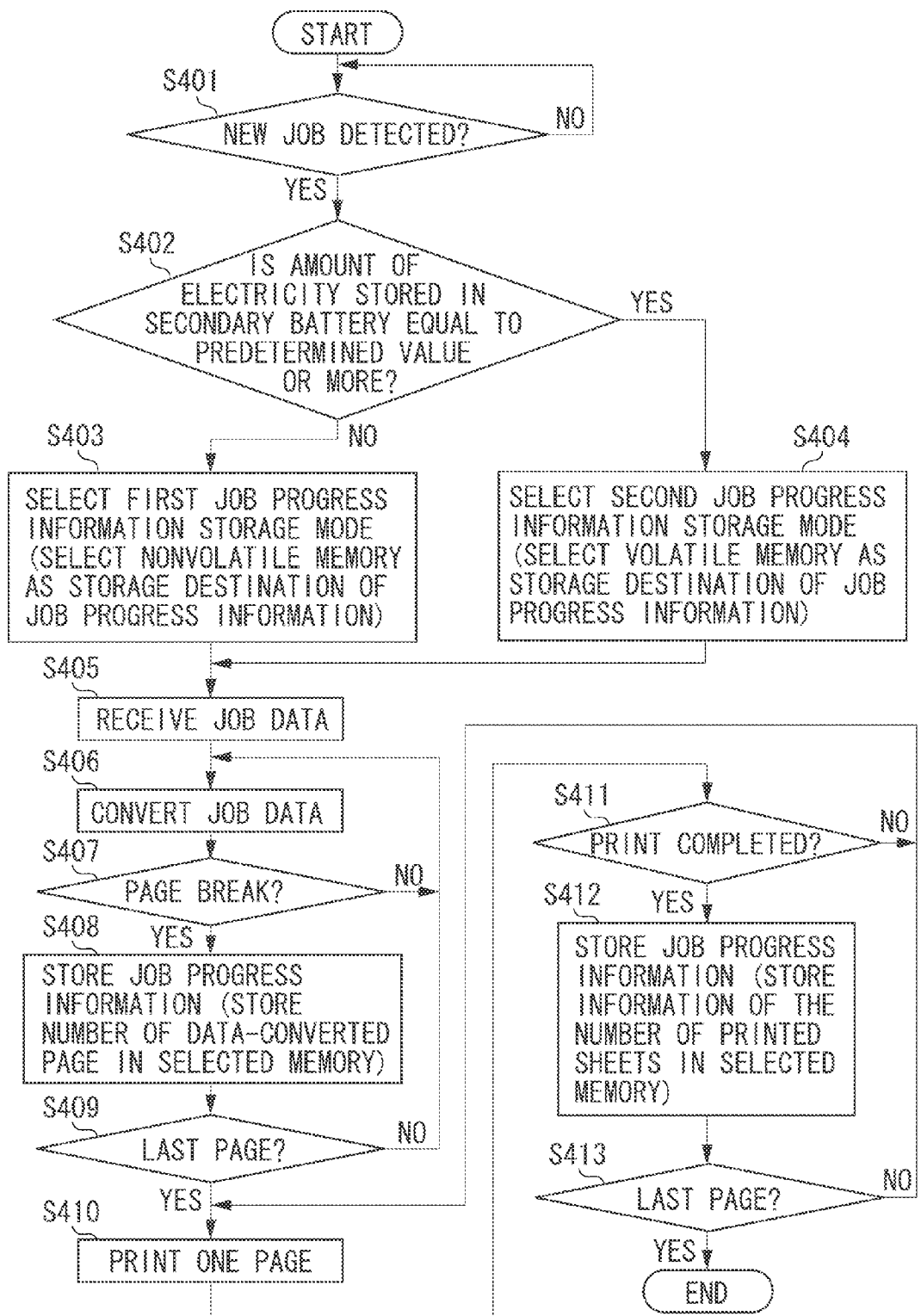
FIG. 4 is a flowchart illustrating a method of controlling the image processing apparatus.

FIG. 4 is a flowchart illustrating a method of controlling the image processing apparatus according to the exemplary embodiment. In this exemplary embodiment, an example of the processing for storing progress information in print job by the control unit 202 is described. Each step is implemented by executing a control program stored in the nonvolatile memory 305 by the CPU 302.

In step S401, the CPU 302 in the control unit 202 determines whether a new job has been detected in the network I/F unit 301. If the CPU 302 determines that a job has been detected (YES in step S401), in step S402, the CPU 302 checks the stored electricity amount of the secondary battery 207, compares the amount with a specified value, and determines whether the amount is greater than or equal to the specified value. The specified value is defined as a value greater than an amount of electricity necessary for copying the job progress information stored in the general-purpose memory 307 to the nonvolatile memory 305 during processing of the job in the second job progress information storage mode at the time of occurrence of a power failure.

In step S402, if the CPU 302 determines that the stored electricity amount is less than the specified value (NO in step S402), in step S403, the CPU 302 selects the first job progress information storage mode. As the storage destination of the job progress information of the detected job, the nonvolatile memory 305 is used until the job is completed. In the first job progress information storage mode, the information is written in the nonvolatile memory 305, and consequently, in some cases, the job processing speed may decrease.

In step S402, if the CPU 302 determines that the stored electricity amount is greater than or equal to the specified value (YES in step S402), in step S404, the CPU 302 selects the second job progress information storage mode. As the storage destination of the job processing information of the detected job, the general-purpose memory 307 is used until the job is completed. In the second job progress information storage mode, the information is written in the high-speed general-purpose memory 307, and consequently, the processing has little influence on the job processing speed. However, when the control unit 202 detects a power failure during monitoring of the voltmeter 215, it is necessary to switch power supply for the control unit 202 to the secondary battery 207, and copy the job progress information stored in the general-purpose memory 307 to the nonvolatile memory 305.

In step S405, the CPU 302 receives job data transmitted from the external PC 102, or the other devices via the network I/F 301, and stores the data in the nonvolatile memory 305. In step S406, the CPU 302, since the received job data is a print job, converts the data format of the job data into a data format printable in each page, and stores the data as print data in the nonvolatile memory 305.

In step S407, the CPU 302 determines whether the data indicates a page break. If the CPU 302 determines that the data does not indicate a page break (NO in step S407), the CPU 302 continues the processing from step S406. If CPU 302 determines that the data indicates a page break (YES in step S407), in step S408, the CPU 302 stores, in the memory selected in step S403 or step S404, the information of the number of the page whose processing has been completed as the job progress information. The information is used in recovery processing subsequent to return from a power failure when the power failure occurs before the completion of the conversion of the data format of the next page.

In the recovery processing, by converting the data format beginning from the page next to the stored page, the data generated prior to the occurrence of the power failure can be used.

In step S409, the CPU 302 determines whether the data conversion processing of the last page has been completed. If the CPU 302 determines that the last page is not processed (NO in step S409), the CPU 302 continues the processing from step S406.

In step S409, if the CPU 302 determines that the last page is processed (YES in step S409), in step S410, the CPU 302 prints the generated print data of one page. In the print processing, the CPU 302 transfers the print data stored in the nonvolatile memory 305 via the printer I/F 306 to the printer unit 204, forms an image on recording paper, and discharges the paper. In step S411, the CPU 302 determines whether the printing of one page has been completed. If the CPU 302 determines that the printing has not been completed (NO in step S411), the CPU 302 continues the processing from step S410.

If in step S411 the CPU 302 determines that the printing has been completed (YES in step S411), in step S412, the CPU 302 stores, as the job progress information, the information of the number of the printed sheets in the memory selected in step S403 or S404.

In step S413, the CPU 302 determines whether the printed page is the last page. If the CPU 302 determines that the printed page is not the last page (NO in step S413), the CPU 302 continues the processing from step S410. If the CPU 302 determines that the printed page is the last page (YES in step S413), the CPU 302 ends the processing relating to the job. The operation in the job processing has been described above.

Figure 5:
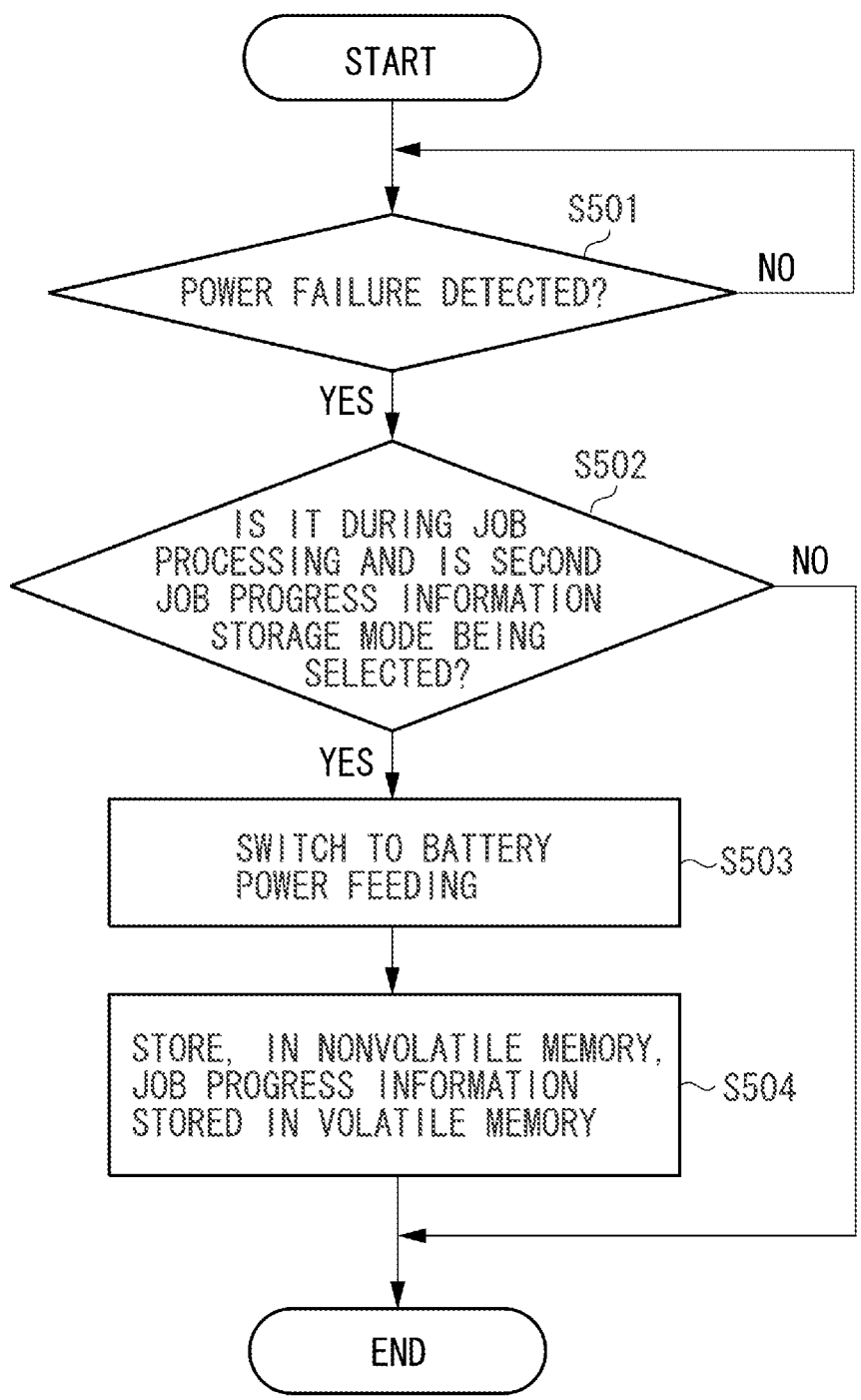
FIG. 5 is a flowchart illustrating a method of controlling the image processing apparatus.

FIG. 5 is a flowchart illustrating a method of controlling the image processing apparatus according to the exemplary embodiment. In this exemplary embodiment, an example of processing to be performed when the image processing apparatus detects a power failure is described. Each step is implemented by executing a control program stored in the nonvolatile memory 305 by the CPU 302. In step S501, the CPU 302 continuously monitors the voltmeter 215 and determines whether the occurrence of a power failure state has been detected. If the CPU 302 determines that the occurrence of a power failure has been detected (YES in step S501), in step S502, the CPU 302 determines whether there is a job being processed, and whether the second job progress information storage mode has been selected. If the CPU 302 determines that the second job progress information storage mode has been selected (YES in step S502), in step S503, the CPU 302 changes the power feeding changing switch 209, and shifts the power source for supplying electricity to the control unit 202 to the secondary battery 207.

In step S504, the CPU 302 copies the job progress information stored in the general-purpose memory 307 to the nonvolatile memory 305, and ends the processing. The processing enables the image processing apparatus to store the job progress information even at the time of the power failure. On the other hand, in step S502, if the CPU 302 determines that the first job progress information storage mode has been selected (NO in step S502), since the progress information has been stored in the nonvolatile memory 305 and the job progress information is stored during the power failure, no processing is performed and this processing ends.

Figure 6:
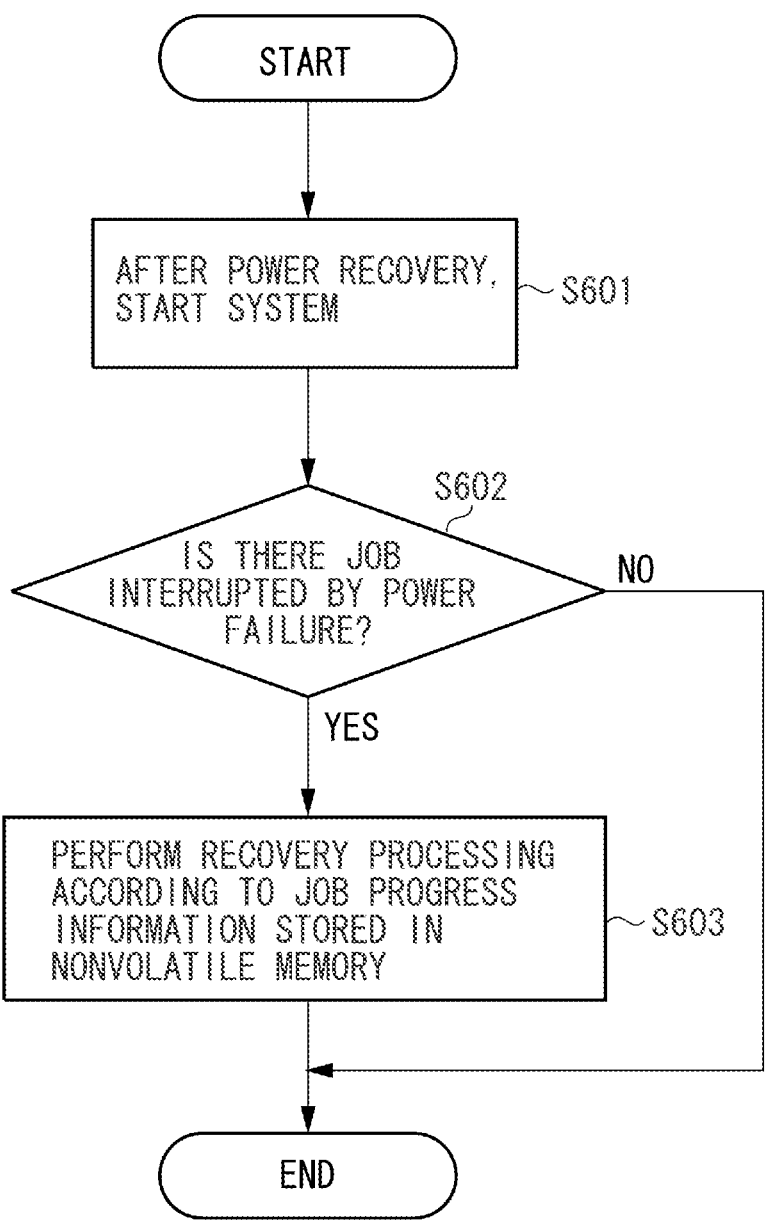
FIG. 6 is a flowchart illustrating a method of controlling the image processing apparatus.

FIG. 6 is a flowchart illustrating a method of controlling the image processing apparatus according to the exemplary embodiment. In this exemplary embodiment, an example of the recovery processing to be performed in the image processing apparatus after return from a power failure is described. Each step is implemented by executing a control program stored in the nonvolatile memory 305 by the CPU 302.

In step S601, with the power source recovering, the CPU 302 starts the system. In step S602, the system starts, and the CPU 302 determines by referring to the progress information stored in the nonvolatile memory 305 whether there is a job stopped due to the power failure.

In step S602, if the CPU 302 determines that there is a job stopped due to the power failure (YES in step S602), in step S603, the CPU 302 refers to the progress information, the job data, and the print data stored in the nonvolatile memory 305, performs recovery processing, and ends the processing. In the recovery processing, the processing is resumed depending on conditions, for example, the case where the processing has been stopped in the middle of the data format conversion processing from the job data to the print data, and the case where the processing has been stopped in the middle of the print processing of the print data.

As described above, depending on the stored electricity amount of the secondary battery 207, one of the volatile memory and the nonvolatile memory is selected for the storage destination of the job progress information. This enables the image forming apparatus to implement the functions without using dedicated hardware, and to prevent cost increase.

Hereinafter, the second exemplary embodiment will be described. The exemplary embodiment according to which the image processing apparatus can change the threshold value of the stored electricity amount of the secondary battery 207 depending on the type of a received job will be described. First, the necessity of the exemplary embodiment is described.

In the above-described image processing apparatus, depending on the type of a job received via the network, the data size of the job progress information may vary. In such a case, the time necessary for selecting the second progress information storage mode and copying the job progress information from the volatile memory to the nonvolatile memory at the time of occurrence of a power failure varies. Consequently, the necessary electricity amount to be stored for the secondary battery 207 also varies.

To solve the problem, in this exemplary embodiment, an individual electricity amount to be stored is calculated depending on the type of a job, and it is determined whether the first progress information storage mode or the second progress information storage mode is to be used to process a received job. By the determination, the possibility of the selection of the second progress information storage mode can be increased, so that the possibility of the decrease in the job processing speed by selecting the first progress information storage mode can be reduced.

Figure 7:
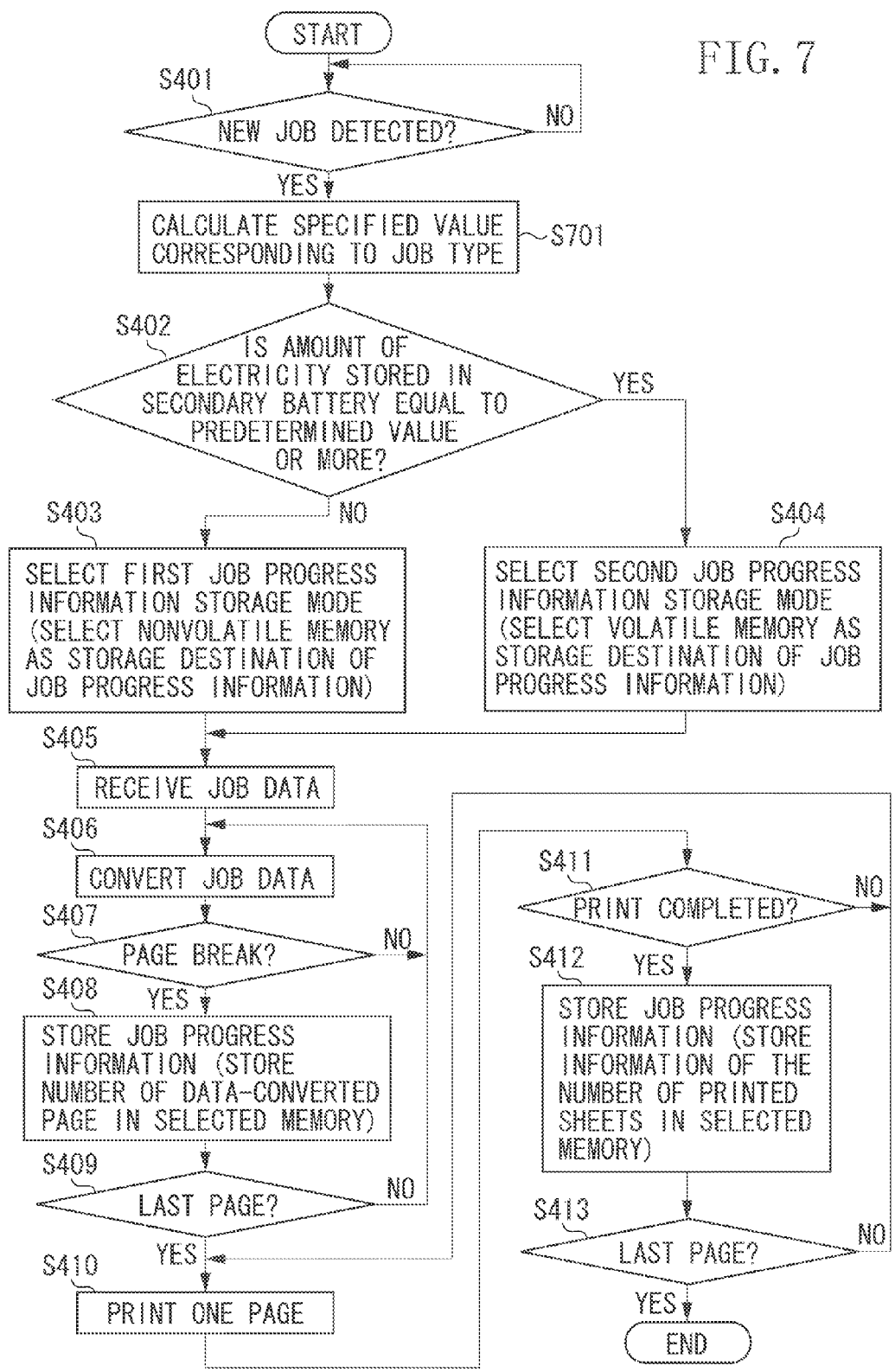
FIG. 7 is a flowchart illustrating a method of controlling the image processing apparatus.

FIG. 7 is a flowchart illustrating a method of controlling the image processing apparatus according to the exemplary embodiment. In this exemplary embodiment, an example of the processing of storing the progress information in print job processing is described. Each step is implemented by executing a control program stored in the nonvolatile memory 305 by the CPU 302. Descriptions of processing similar to that described with reference to FIG. 4 are omitted.

In this exemplary embodiment, after the detection of a job by the CPU 302 in step S401, in step S701, the CPU 302 determines the threshold value of an electricity amount to be stored corresponding to the type of the job.

FIG. 8 illustrates a table for managing the threshold values of the electricity amounts to be stored corresponding to the types of jobs. In this exemplary embodiment, in step S701 in FIG. 7, when the CPU 302 determines a threshold value, the CPU 302 refers to the table illustrated in FIG. 8. In this exemplary embodiment, depending on the types of jobs received by the image processing apparatus, specified values, which will be described below, vary.

In FIG. 8, the column T101 indicates types of jobs, and the column T102 indicates time necessary for copying job progress information from the general-purpose memory 307 to the nonvolatile memory 305 corresponding to the types of the jobs at the time of occurrence of a power failure in the second progress information storage mode.

The column T103 indicates a stored electricity amount (a predetermined value) necessary for supplying electricity from the secondary battery to the control unit 202. If the detected job is a FAX job, the electricity of 2 mAh is required. As in the first exemplary embodiment, in the case where a constant threshold value is used irrespective of the types of jobs, the electricity of 12 mAh required in a print job, which is the maximum value in the column T103, is to be set. According to the first exemplary embodiment, in the case of the detection of the FAX job, only the threshold value of 2 mAh is sufficient. However, the unnecessary threshold value of 12 mAh is set, and this reduces the possibility of the selection of the second progress information storage mode.

As described above, in this exemplary embodiment, an optimum threshold value for the electricity amount to be stored corresponding to the type of the job can be used, and this increases the possibility for the image processing apparatus to select the second progress information storage mode. This can reduce the possibility of the decrease in job processing speed when the first progress information storage mode is selected.

Further, when the stored electricity amount of the secondary battery is less than a specified value, the storage destination of the job progress information is the nonvolatile memory, and when the stored electricity amount is greater than or equal to the specified value, the storage destination is a high-speed volatile memory to reduce the influence on the job processing. Further, without using dedicated hardware, by the use of the volatile memory and the nonvolatile memory, cost increase can be prevented.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-105062 filed May 17, 2013, which is hereby incorporated by reference herein in its entirety.

What is claimed is:

1. An image processing apparatus comprising:
   a reception unit configured to receive a job;
   a rechargeable secondary battery;
   a detection unit configured to detect an amount of electricity stored in the secondary battery in response to the reception of the job;
   a determination unit configured to determine whether the detected amount of electricity exceeds a specified value; and
   a selection unit configured to select a volatile memory as a storage destination of information to be stored when the job is executed if it is determined that the stored electricity amount exceeds the specified value, and select a nonvolatile memory as the storage destination of information to be stored when the job is executed if it is determined that the stored electricity amount does not exceed the specified value.

2. The image processing apparatus according to claim 1, further comprising:
   a detection unit configured to detect a power failure state; and
   a control unit configured to store the information stored in the volatile memory in the nonvolatile memory using a power source supplied from the secondary battery if the volatile memory has been selected, and the power failure state has been detected.

3. The image processing apparatus according to claim 1, wherein the information is progress information of the job.

4. The image processing apparatus according to claim 2, further comprising:
   a recovery processing unit configured to perform predetermined recovery processing based on the information stored in the nonvolatile memory when the image processing apparatus returns from the power failure state.

5. The image processing apparatus according to claim 1, wherein the specified values vary depending on types of received jobs.

6. The image processing apparatus according to claim 1 wherein the job includes a print job, a scan job, a copy job, and a facsimile job.

7. A method of controlling an image processing apparatus having a rechargeable secondary battery, the method comprising:
   receiving a job;
   detecting an amount of electricity stored in the secondary battery in response to the reception of the job;
   determining whether the detected amount of electricity exceeds a specified value; and
   selecting a volatile memory as a storage destination of information to be stored when the job is executed if it is determined that the stored electricity amount exceeds the specified value, and selecting a nonvolatile memory as the storage destination of information to be stored when the job is executed if it is determined that the stored electricity amount does not exceed the specified value.

* * * * *